US008603235B2

(12) United States Patent
Wong et al.

(10) Patent No.: US 8,603,235 B2
(45) Date of Patent: Dec. 10, 2013

(54) PHASE CHANGE INKS CONTAINING FISCHER-TROPSCH WAXES

(75) Inventors: Raymond W Wong, Mississauga (CA); Bo Wu, Wilsonville, OR (US); Christopher A Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 399 days.

(21) Appl. No.: 12/061,810

(22) Filed: Apr. 3, 2008

(65) Prior Publication Data
US 2009/0249977 A1 Oct. 8, 2009

(51) Int. Cl.
C09D 11/02 (2006.01)
C09D 11/00 (2006.01)

(52) U.S. Cl.
USPC ............ 106/31.61; 524/198; 106/31.29; 106/31.43; 106/31.49; 106/31.75; 106/31.79

(58) Field of Classification Search
USPC ............................................. 106/31
See application file for complete search history.

(56) References Cited

U.S. PATENT DOCUMENTS

| 3,653,932 | A | 4/1972 | Berry et al. |
| 4,390,369 | A | 6/1983 | Merritt et al. |
| 4,484,948 | A | 11/1984 | Merritt et al. |
| 4,684,956 | A | 8/1987 | Ball |
| 4,851,045 | A | 7/1989 | Taniguchi |
| 4,889,560 | A | 12/1989 | Jaeger et al. |
| 5,006,170 | A | 4/1991 | Schwarz et al. |
| 5,053,079 | A | 10/1991 | Haxell et al. |
| 5,151,120 | A | 9/1992 | You et al. |
| 5,372,852 | A | 12/1994 | Titterington et al. |
| 5,496,879 | A * | 3/1996 | Griebel et al. ............... 524/320 |
| 5,710,420 | A * | 1/1998 | Martin et al. ................ 235/487 |
| 6,001,904 | A | 12/1999 | Matzinger et al. |
| 6,414,051 | B1 * | 7/2002 | Goodbrand et al. .......... 523/160 |
| 6,858,070 | B1 * | 2/2005 | Wong et al. ................ 106/31.61 |
| 6,860,930 | B2 | 3/2005 | Wu et al. |
| 6,878,198 | B1 | 4/2005 | Drappel et al. |
| 7,186,762 | B2 | 3/2007 | Wong et al. |
| 7,311,768 | B2 | 12/2007 | Wu et al. |
| 2004/0261656 | A1 | 12/2004 | Wu et al. |
| 2005/0130054 | A1 | 6/2005 | Yuan et al. |
| 2007/0120914 | A1 * | 5/2007 | Wu et al. ......................... 347/99 |
| 2007/0120927 | A1 * | 5/2007 | Snyder et al. ................ 347/100 |
| 2008/0098929 | A1 * | 5/2008 | Turek et al. ................ 106/31.29 |
| 2008/0297556 | A1 * | 12/2008 | Turek et al. ..................... 347/20 |

FOREIGN PATENT DOCUMENTS

| EP | 0187352 | 7/1986 |
| EP | 0206286 | 12/1986 |
| EP | 1 916 281 A1 | 4/2008 |
| WO | WO 94/04619 | 3/1994 |

OTHER PUBLICATIONS

Canadian Office Action for Canadian Application No. 2,660,508, mailed Dec. 10, 2010.
DE 4205636AL, DE 4205636 A1, Aug. 26, 1993.
DE 4205713AL, DE 4205713 A1, Aug. 26, 1993.

* cited by examiner

Primary Examiner — Yun Qian
(74) Attorney, Agent, or Firm — Oliff & Berridge, PLC

(57) ABSTRACT

Disclosed is a phase change ink comprising (a) a carbon black pigment, (b) a bis-urethane, and (c) a phase change ink carrier, said carrier comprising (i) a branched triamide and (ii) a Fischer-Tropsch wax having an average peak molecular weight of from about 300 to about 800 and a polydispersity of from about 1.001 to about 3.

20 Claims, 1 Drawing Sheet

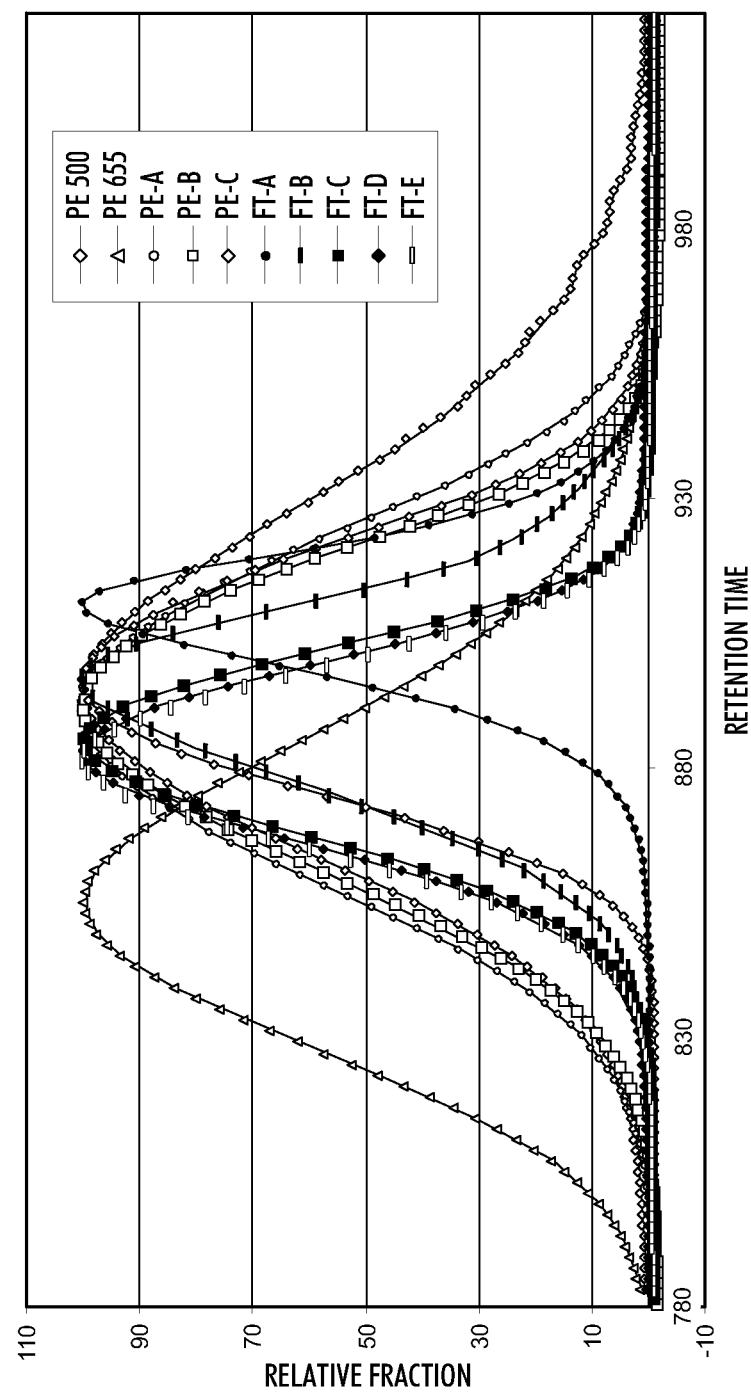

PHASE CHANGE INKS CONTAINING FISCHER-TROPSCH WAXES

CROSS-REFERENCE TO RELATED APPLICATIONS

Copending Application U.S. Ser. No. 11/553,260, filed Oct. 26, 2006, with the named inventors Caroline M. Turek, Raymond W. Wong, Adela Goredema, and Christopher A. Wagner, entitled "Phase Change Inks," the disclosure of which is totally incorporated herein by reference, discloses a phase change ink having an ink vehicle, at least one colorant, at least one triamide, and at least one bis-urethane. The at least one triamide and at least one bis-urethane assist in dispersing colorants, such as pigments like carbon black, in non-polar ink vehicles. Also, disclosed are methods of making such phase change inks.

BACKGROUND

Disclosed herein are hot melt or phase change inks and methods for the use thereof. More specifically, disclosed herein are hot melt or phase change inks particularly suitable for use in phase change ink jet printing processes with reduced energy requirements. One embodiment is directed to a phase change ink comprising (a) a carbon black pigment, (b) a bis-urethane, and (c) a phase change ink carrier, said carrier comprising (i) a branched triamide and (ii) a Fischer-Tropsch wax having an average peak molecular weight of from about 300 to about 800 and a polydispersity of from about 1.001 to about 3. Also disclosed herein is a process which comprises (1) incorporating into an ink jet printing apparatus a phase change ink comprising (a) a carbon black pigment, (b) a bis-urethane, and (c) a phase change ink carrier, said carrier comprising (i) a branched triamide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Many phase change inks demonstrate a propensity to weep in the printhead of an inkjet printing apparatus. Weeping refers to the uncontrolled flow of ink from the nozzles of an ink jet printhead onto the face of the printhead, as can occur following the passage of the wiper blade across the nozzles or ink jet heads during a purge cycle. Some of the ramifications of weeping include excessive ink purge volume, color mixing in the jets resulting in poor color reproduction in subsequent prints, and potential jetting reliability/robustness issues.

In pigment-based inks in particular, such as those having carbon black particles, weeping can be observed. Some challenges exist in effectively dispersing pigments in current phase change ink vehicles. For example, the non-polar components in the ink vehicle can hinder pigment stability in the ink. Dispersants can be used to stabilize the pigment particles in the non-polar ink vehicle, but while some dispersants assist with stability, they do not address weeping.

U.S. Pat. No. 6,860,930 (Wu et al.), the disclosure of which is totally incorporated herein by reference, discloses a phase change ink composition comprising (a) a colorant and (b) a carrier comprising a polyamide, wherein the polyamide component of the carrier contains at least about 10 percent by weight of a branched triamide.

U.S. Patent Publication 2005/0130054 (Yuan et al.), the disclosure of which is totally incorporated herein by reference, discloses wax based inks for phase change/hot melt inkjet printing or thermal transfer printing applications. Also disclosed are waxes useful for toners for use in electrostatographic printing applications. Both materials are prepared using a wax having a narrow melting range. The narrow melting range of the wax reduces energy requirements in printing applications. The use of the waxes also promotes release for high speed printing and especially promotes fast drying in wax based ink applications.

U.S. Pat. No. 6,001,904 (Matzinger et al.), the disclosure of which is totally incorporated herein by reference, discloses phase change (hot melt) ink compositions for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties to comprise: (a) from about 0.1% to about 30% of one or more colorants; and (b) from about 0.1 to about 99.9% of one or more reversibly-crosslinked-polymers. Components other than those listed above can be included in the ink compositions to achieve specific printer, substrate, or end use requirements. Furthermore, the invention also includes methods for the preparation of reversibly-crosslinked-polymers and for their use in the above-described inks.

U.S. Pat. No. 7,311,768 (Wu et al.), the disclosure of which is totally incorporated herein by reference, discloses a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3. Also disclosed is a process which comprises (1) incorporating into an ink jet printing apparatus a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

U.S. Pat. No. 6,858,070 (Wong et al.), the disclosure of which is totally incorporated herein by reference, discloses an ink composition comprising (a) an ink carrier which comprises a monoamide, a tetra-amide, or a mixture thereof; (b) a polyalkylene succinimide; and (c) pigment particles. Also disclosed is an ink composition comprising (a) an ink carrier, (b) a polyalkylene succinimide, and (c) pigment particles, said ink having a conductivity greater than $1 \times 10^{-8}$ Siemens per centimeter. Also disclosed is an ink set comprising (1) a first ink comprising (a) an ink carrier, (b) a polyalkylene succinimide, and (c) pigment particles, and (2) a second ink comprising a dye colorant and a second ink carrier, wherein the first ink carrier contains substantially the same components as the second ink carrier.

U.S. Pat. No. 6,878,198 (Drappel et al.), the disclosure of which is totally incorporated herein by reference, discloses phase change ink compositions comprising (a) an ink carrier comprising a monoamide and a tetra-amide, and (b) pigment particles having oxygen-containing functional groups on the surfaces thereof. Also disclosed are processes for preparing a phase change ink which comprise (a) melting a tetra-amide which is solid at about 25° C.; (b) admixing with the molten tetra-amide pigment particles having oxygen-containing functional groups on the surfaces thereof; (c) maintaining the mixture of pigment and tetra-amide at a temperature of at least about 100° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide; (e) subsequent to addition of the monoamide, subjecting the resulting mixture to high shear mixing; and (f) subsequent to subjecting the mixture to high shear mixing, optionally adding to the mixture additional ink ingredients.

U.S. Pat. No. 7,186,762 (Wong et al.), the disclosure of which is totally incorporated herein by reference, discloses a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above about the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

U.S. Pat. No. 5,053,079 (Haxell et al.), the disclosure of which is totally incorporated herein by reference, discloses a dispersed, pigmented hot melt ink containing a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle. Preferred is the isocyanate-modified microcrystalline wax marketed as Petrolite WB17.

While known compositions and processes are suitable for their intended purposes, a need remains for improved phase change ink compositions. In addition, a need remains for phase change inks that can be jetted at temperatures below about 125° C. Further, a need remains for phase change inks that can be jetted with reduced energy requirements. Additionally, a need remains for phase change inks that can be jetted with less expensive printheads. There is also a need for phase change inks that enable improved thermal stability of the inks manifested as the color's stability over time when heated in printers. In addition, there is a need for phase change inks that enable improved printer reliability. Further, there is a need for phase change inks that enable quick recovery times from standby mode. Additionally, there is a need for phase change inks that enable printing with "instant-on" mode. A need also remains for phase change inks that exhibit desirable viscosity values at reduced printing temperatures. In addition, a need remains for phase change inks that enable the aforementioned advantages and also exhibit good printing characteristics, such as transfixing properties (including dither and solid fill dropout performance), acceptable missed jets, folding and creasing performance, gloss, color intensity, recovery after standby mode, and the like. Further, a need remains for phase change inks that generate images with improved hardness. Additionally, there is a need for phase change inks that generate images with improved gloss. There is also a need for phase change inks that exhibit reduced sweating; sweating is a problem wherein some ink ingredients migrate to the surface of solid ink sticks and aggregate at the ink stick surface inside the printer; the sticky "sweat" gradually drains down to the bottom and can cause the ink sticks to be difficult to slide in the ink load racks in the printers. In addition, there is a need for phase change inks that generate images with reduced showthrough when printed on paper substrates. Further, there is a need for phase change inks that exhibit reduced clogging of printheads while exhibiting all of the aforementioned advantages. Additionally, there is a need for phase change inks that enable reduced standby temperatures of phase change ink jet printheads without leading to clogging of the printhead. A need also remains for phase change inks with desirably low freezing points. In addition, a need remains for phase change inks that transfer efficiently from an intermediate transfer member to a final recording substrate with reduced pixels left on the intermediate transfer member when the intermediate transfer member is at a desirably high temperature to enable efficient transfer member cooling and avoid automatic printer shutoff from heating of the intermediate transfer member by the ink, while also enabling jetting of the ink at a desirably low temperature. Further, a need remains for phase change inks that exhibit desirably high smudge temperatures when still-hot prints pass along guidance tracks in the printer, thereby reducing accumulation of ink along these guidance tracks that could later be transferred to blank paper. Additionally, a need remains for phase change inks that exhibit the above advantages and can also be prepared at desirably low costs. There is also a need for phase change inks that have desirably high cohesive failure temperatures. There is also a need for phase change inks that have desirably high cohesive failure temperatures. In addition, there is a need for phase change inks that exhibit reduced showthrough of printed images on the backside of paper substrates, particularly when aged at relatively high temperatures. Further, there is a need for phase change inks that exhibit reduced weeping from the printhead.

SUMMARY

Disclosed herein is a phase change ink comprising (a) a carbon black pigment, (b) a bis-urethane, and (c) a phase change ink carrier, said carrier comprising (i) a branched triamide and (ii) a Fischer-Tropsch wax having an average peak molecular weight of from about 300 to about 800 and a polydispersity of from about 1.001 to about 3. Also disclosed herein is a process which comprises (1) incorporating into an ink jet printing apparatus a phase change ink comprising (a) a carbon black pigment, (b) a bis-urethane, and (c) a phase change ink carrier, said carrier comprising (i) a branched triamide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

BRIEF DESCRIPTION OF THE DRAWING

The FIGURE is a reproduction of high temperature gel permeation chromatography (also called size exclusion chromatography (SEC)) curves obtained for polyethylene waxes and Fischer-Tropsch waxes of different average peak molecular weight values, showing the relative amounts of molecules with different molecular weights present in the sample on the "y" axis and the retention time on the "x" axis.

DETAILED DESCRIPTION

The phase change inks disclosed herein contain a carrier comprising a Fischer-Tropsch wax. Fischer-Tropsch waxes can be prepared from the hydrogen and carbon monoxide mixture obtained by passing steam over hot coal. The synthesis can be carried out with metallic catalysts at high temperature and pressure. They are synthetic hydrocarbons, as opposed to natural hydrocarbons. They differ from polyethylene waxes, which are prepared by the polymerization of ethylene ($CH_2=CH_2$) in that polyethylene waxes tend to be completely linear, whereas Fischer-Tropsch waxes tend to have some degree of branching therein. Because of this branching, Fischer-Tropsch waxes tend to be somewhat less crystalline and somewhat less hard compared to the perfectly linear polyethylene waxes.

Fischer-Tropsch waxes included in the inks disclosed herein have an average peak molecular weight, as measured by high temperature gel permeation chromatography, of in one embodiment at least about 300, in another embodiment at least about 375, and in yet another embodiment at least about 400, and in one embodiment no more than about 800, in another embodiment no more than about 750, and in yet another embodiment no more than about 700, although the average peak molecular weight can be outside of these ranges.

The Fischer-Tropsch wax has a polydispersity (determined by dividing weight average molecular weight by number average molecular weight) in one embodiment of at least about 1.001, in another embodiment of at least about 1.005, and in yet another embodiment of at least about 1.010, and in one embodiment of no more than about 3, in another embodiment of no more than about 2.5, and in yet another embodiment of no more than about 2, although the polydispersity can be outside of these ranges.

The Fischer-Tropsch wax has a peak melting point (as measured by differential scanning calorimetry (DSC)) in one embodiment of at least about 50° C., in another embodiment at least about 55° C., and in yet another embodiment of at least about 60° C., and in one embodiment of no more than about 105° C., in another embodiment of no more than about 100° C., and in yet another embodiment of no more than about 95° C., although the peak melting point can be outside of these ranges.

The Fischer-Tropsch wax has an onset melting point (as measured by differential scanning calorimetry (DSC)) in one embodiment of at least about 40° C., in another embodiment at least about 45° C., and in yet another embodiment of at least about 50° C., and in one embodiment of no more than about 105° C., in another embodiment of no more than about 100° C., and in yet another embodiment of no more than about 95° C., although the onset melting point can be outside of these ranges.

The Fischer-Tropsch wax has a melting range, which is defined as the difference between ending melting point and onset melting point as defined in ASTM D3418-03, in one embodiment of at least about 5° C., in another embodiment at least about 8° C., and in yet another embodiment of at least about 10° C., and in one embodiment of no more than about 40° C., in another embodiment of no more than about 30° C., and in yet another embodiment of no more than about 25° C., although the melting range can be outside of these ranges.

The Fischer-Tropsch wax has a freezing point (as measured by differential scanning calorimetry (DSC)) in one embodiment of at least about 40° C., in another embodiment at least about 50° C., and in yet another embodiment of at least about 55° C., and in one embodiment of no more than about 90° C., in another embodiment of no more than about 88° C., and in yet another embodiment of no more than about 85° C., although the freezing point can be outside of these ranges.

The Fischer-Tropsch wax has a viscosity at about 110° C. in one embodiment of at least about 2 centipoise, in another embodiment of at least about 3 centipoise, and in yet another embodiment of at least about 4 centipoise, and in one embodiment of no more than about 11 centipoise, in another embodiment of no more than about 10 centipoise, and in yet another embodiment of no more than about 9 centipoise, although the viscosity can be outside of these ranges.

By "average peak molecular weight" is meant that the Fischer-Tropsch wax, while comprising a mixture of molecules of the formula —$(CH_2)_n$— wherein n is an integer representing the number of repeat —$CH_2$— units, has a distribution of molecules such that a plot of the relative amount of molecules versus the retention time or molecular weight would appear as a bell curve, wherein the peak of the bell curve represents the average peak molecular weight. In contrast, polyethylene waxes having a different average peak molecular weight value, while they may contain materials that overlap in the value of "n", will have different characteristics.

Shown in the FIGURE are measurements of molecular weight taken for some polyethylene waxes and some Fischer-Tropsch waxes by high temperature gel permeation chromatography with a Polymer Labs 220HT system using refractive index detection, a mobile phase of 1,2,4-trichlorobenzene, and two Polymer 3 μm Mixed-E columns for separation. The entire system and the sample solution before injection were heated to 140° C. The molecular weights were characterized using polyethylene standards for calibration. One material (PE500) was a polyethylene wax commercially available from Baker Petrolite, Tulsa, Okla., being POLYWAX® 500 (PE 500). Also measured was a polyethylene wax commercially available from Baker Petrolite, Tulsa, Okla., being POLYWAX® 655 (PE655). Also measured was a polyethylene wax commercially available from Baker Petrolite, Tulsa, Okla., having a molecular weight of about 655 (PE 655). Also measured (PE-A) was a polyethylene wax obtained from Baker Petrolite, Tulsa, Okla., being similar to POLYWAX® 500 but having had removed by distillation the lowest 10 percent molecular weight fraction. This distillation can be carried out as described in, for example, U.S. Patent Publication 2005/0130054, the disclosure of which is totally incorporated herein by reference. Also measured (PE-B) was a polyethylene wax obtained from Baker Petrolite, Tulsa, Okla., being similar to POLYWAX® 500 but having had removed by distillation the lowest 15 percent molecular weight fraction. Also measured (PE-C) was a polyethylene wax obtained from Baker Petrolite, Tulsa, Okla., being similar to POLYWAX® 500 but having had removed by distillation both the lowest 15 percent molecular weight fraction and the highest 15 percent molecular weight fraction. Also measured (FT-A) was a Fischer-Tropsch wax commercially available from Sasol Wax Americas, Inc., Shelton, Conn. as SASOLWAX® C77, said wax having been fractioned by distillation. Also measured (FT-B) was a Fischer-Tropsch wax commercially available from Sasol Wax Americas, Inc. as SASOLWAX® C80, said wax having been fractioned by distillation. Also measured (FT-C) was a Fischer-Tropsch wax obtained from Sasol Wax Americas, Inc., said wax being similar to SASOLWAX® C80 but having had removed by distillation the lowest 9 percent molecular weight fraction. Also measured (FT-D) was a Fischer-Tropsch wax obtained from Sasol Wax Americas, Inc., said wax being similar to SASOLWAX® C80 but having had removed by distillation the lowest 20 percent molecular weight fraction. Also measured (FT-E) was a Fischer-Tropsch wax obtained from Sasol Wax Americas, Inc., said wax being similar to SASOLWAX® C80 but having had removed by distillation the lowest 30 percent molecular weight fraction.

| retention times (sec.) | PE 500 | PE 655 | PE-A | PE-B | PE-C | FT-A | FT-B | FT-C | FT-D | FT-E |
|---|---|---|---|---|---|---|---|---|---|---|
| 750 | 0.1 | −0.7 | −1.4 | −1.8 | −0.9 | −0.4 | −0.8 | −0.7 | −0.1 | −1.1 |
| 755 | 0.2 | −0.6 | −1.4 | −1.8 | −0.9 | −0.4 | −0.8 | −0.7 | −0.1 | −1.1 |
| 760 | 0.2 | −0.4 | −1.4 | −1.8 | −0.9 | −0.4 | −0.8 | −0.7 | −0.1 | −1.1 |
| 765 | 0.2 | −0.1 | −1.4 | −1.8 | −0.9 | −0.4 | −0.7 | −0.7 | −0.1 | −1.0 |
| 770 | 0.3 | 0.1 | −1.3 | −1.7 | −0.9 | −0.4 | −0.6 | −0.7 | −0.1 | −1.0 |
| 775 | 0.3 | 0.6 | −1.3 | −1.6 | −0.9 | −0.4 | −0.6 | −0.7 | −0.1 | −1.0 |
| 780 | 0.4 | 1.2 | −1.2 | −1.4 | −0.9 | −0.4 | −0.5 | −0.7 | 0.0 | −1.0 |
| 785 | 0.6 | 2.1 | −1.2 | −1.2 | −0.9 | −0.4 | −0.5 | −0.7 | 0.0 | −1.0 |
| 790 | 0.8 | 3.6 | −1.0 | −1.0 | −0.9 | −0.4 | −0.4 | −0.7 | 0.0 | −1.0 |
| 795 | 1.0 | 6.0 | −0.8 | −0.6 | −1.0 | −0.4 | −0.3 | −0.6 | 0.0 | −1.0 |
| 800 | 1.3 | 9.7 | −0.5 | −0.1 | −1.0 | −0.4 | −0.3 | −0.6 | 0.1 | −1.0 |
| 805 | 1.8 | 14.8 | 0.0 | 0.6 | −1.0 | −0.4 | −0.2 | −0.6 | 0.1 | −0.9 |
| 810 | 2.3 | 21.8 | 0.6 | 1.5 | −1.0 | −0.4 | −0.1 | −0.5 | 0.2 | −0.8 |
| 815 | 3.2 | 30.6 | 1.7 | 2.8 | −1.0 | −0.4 | 0.1 | −0.4 | 0.3 | −0.7 |
| 820 | 4.5 | 41.1 | 3.2 | 4.8 | −1.0 | −0.4 | 0.2 | −0.2 | 0.6 | −0.4 |
| 825 | 6.3 | 52.6 | 5.6 | 7.5 | −0.9 | −0.4 | 0.5 | 0.2 | 1.0 | 0.0 |
| 830 | 8.9 | 64.5 | 8.9 | 11.4 | −0.9 | −0.4 | 0.8 | 0.8 | 1.7 | 0.8 |
| 835 | 12.6 | 75.9 | 13.5 | 16.5 | −0.7 | −0.4 | 1.4 | 2.1 | 3.1 | 2.3 |
| 840 | 17.6 | 85.8 | 19.6 | 23.1 | −0.3 | −0.3 | 2.5 | 4.4 | 5.6 | 5.0 |
| 845 | 24.1 | 93.5 | 27.1 | 30.9 | 0.6 | −0.3 | 4.4 | 8.3 | 9.8 | 9.6 |
| 850 | 32.0 | 98.3 | 35.9 | 40.0 | 2.8 | −0.2 | 7.6 | 14.6 | 16.5 | 16.8 |
| 855 | 41.3 | 100.0 | 45.9 | 50.0 | 7.0 | 0.1 | 12.6 | 23.9 | 26.7 | 27.6 |
| 860 | 51.4 | 98.6 | 56.5 | 60.4 | 14.4 | 0.4 | 20.0 | 36.9 | 40.5 | 42.3 |
| 865 | 61.9 | 94.3 | 67.2 | 70.6 | 26.0 | 1.2 | 30.0 | 52.9 | 57.3 | 59.9 |
| 870 | 72.2 | 87.8 | 77.3 | 80.1 | 41.3 | 2.6 | 42.3 | 70.2 | 75.1 | 77.9 |
| 875 | 81.7 | 79.7 | 86.2 | 88.2 | 58.7 | 5.2 | 56.2 | 86.0 | 90.2 | 92.4 |
| 880 | 89.6 | 70.6 | 93.2 | 94.4 | 75.3 | 10.1 | 70.1 | 96.7 | 98.9 | 99.6 |
| 881 | 90.9 | 68.8 | 94.3 | 95.4 | 78.2 | 11.5 | 72.8 | 98.0 | 99.6 | 100.0 |
| 882 | 92.2 | 66.9 | 95.3 | 96.3 | 81.0 | 13.0 | 75.5 | 99.0 | 100.0 | 99.9 |
| 884 | 94.5 | 63.1 | 97.1 | 97.8 | 86.1 | 16.4 | 80.6 | 100.0 | 99.5 | 98.7 |
| 885 | 95.5 | 61.2 | 97.9 | 98.4 | 88.4 | 18.4 | 83.1 | 99.9 | 98.8 | 97.6 |
| 890 | 99.0 | 52.0 | 99.9 | 99.9 | 96.6 | 31.1 | 93.6 | 94.9 | 89.9 | 87.2 |
| 891 | 99.4 | 50.3 | 100.0 | 100.0 | 97.7 | 34.2 | 95.3 | 93.0 | 87.2 | 84.4 |
| 895 | 100.0 | 43.4 | 99.1 | 99.0 | 99.9 | 48.5 | 99.6 | 82.5 | 74.4 | 71.3 |
| 896.5 | 99.8 | 41.0 | 98.4 | 98.3 | 100.0 | 54.5 | 100.0 | 77.7 | 69.0 | 65.9 |
| 900 | 98.6 | 35.7 | 95.4 | 95.9 | 98.5 | 69.3 | 97.3 | 64.9 | 55.9 | 53.1 |
| 905 | 95.0 | 28.7 | 89.0 | 90.4 | 93.4 | 89.5 | 84.0 | 45.3 | 37.6 | 35.5 |
| 910 | 89.7 | 22.8 | 79.8 | 82.6 | 84.9 | 99.9 | 62.9 | 27.3 | 22.2 | 20.8 |
| 910.5 | 89.1 | 22.2 | 78.8 | 81.8 | 83.9 | 100.0 | 60.7 | 25.7 | 20.9 | 19.5 |
| 915 | 82.8 | 17.9 | 67.9 | 73.6 | 73.2 | 90.7 | 42.5 | 13.9 | 11.5 | 10.4 |
| 920 | 75.0 | 13.9 | 54.8 | 63.6 | 60.1 | 64.8 | 28.1 | 6.0 | 5.3 | 4.3 |
| 925 | 67.4 | 10.5 | 41.2 | 51.9 | 46.3 | 38.8 | 19.4 | 2.4 | 2.5 | 1.5 |
| 930 | 58.8 | 8.0 | 28.0 | 41.8 | 32.7 | 21.8 | 13.9 | 0.9 | 1.4 | 0.4 |
| 935 | 51.2 | 5.7 | 17.8 | 30.7 | 22.0 | 12.1 | 9.5 | 0.4 | 1.0 | 0.0 |
| 940 | 43.9 | 4.3 | 9.7 | 22.3 | 13.2 | 6.5 | 5.6 | 0.1 | 0.8 | −0.2 |
| 945 | 36.7 | 2.9 | 4.9 | 14.5 | 7.7 | 3.3 | 2.7 | −0.1 | 0.7 | −0.4 |
| 950 | 31.3 | 2.0 | 1.8 | 9.2 | 3.9 | 1.5 | 1.1 | −0.2 | 0.6 | −0.5 |
| 955 | 25.2 | 1.2 | 0.3 | 4.9 | 2.0 | 0.6 | 0.3 | −0.3 | 0.5 | −0.5 |

-continued

| retention times (sec.) | PE 500 | PE 655 | PE-A | PE-B | PE-C | FT-A | FT-B | FT-C | FT-D | FT-E |
|---|---|---|---|---|---|---|---|---|---|---|
| 960 | 21.4 | 0.8 | −0.6 | 2.6 | 0.7 | 0.1 | −0.1 | −0.4 | 0.5 | −0.6 |
| 965 | 16.9 | 0.2 | −1.0 | 0.5 | 0.1 | −0.1 | −0.3 | −0.4 | 0.4 | −0.7 |
| 970 | 13.5 | 0.1 | −1.3 | −0.2 | −0.4 | −0.2 | −0.3 | −0.5 | 0.4 | −0.7 |
| 975 | 11.4 | −0.3 | −1.4 | −1.1 | −0.6 | −0.2 | −0.3 | −0.6 | 0.3 | −0.8 |
| 980 | 7.4 | −0.4 | −1.5 | −1.4 | −0.8 | −0.2 | −0.3 | −0.6 | 0.2 | −0.8 |
| 985 | 6.8 | −0.6 | −1.5 | −1.7 | −0.9 | −0.3 | −0.3 | −0.7 | 0.2 | −0.9 |
| 990 | 4.4 | −0.8 | −1.6 | −1.9 | −1.0 | −0.3 | −0.4 | −0.7 | 0.2 | −0.9 |
| 995 | 2.9 | −0.7 | −1.6 | −1.9 | −1.0 | −0.3 | −0.6 | −0.8 | 0.1 | −1.0 |
| 1000 | 2.6 | −0.9 | −1.6 | −2.0 | −1.0 | −0.3 | −0.8 | −0.8 | 0.1 | −1.0 |
| 1005 | 1.5 | −0.9 | −1.6 | −2.1 | −1.1 | −0.3 | −0.9 | −0.8 | 0.1 | −1.1 |
| 1010 | 0.9 | −0.9 | −1.7 | −2.0 | −1.1 | −0.4 | −1.0 | −0.9 | 0.1 | −1.1 |
| 1015 | 0.9 | −0.9 | −1.7 | −2.1 | −1.1 | −0.4 | −1.0 | −0.9 | 0.1 | −1.1 |
| 1020 | 0.6 | −1.1 | −1.7 | −2.1 | −1.1 | −0.4 | −1.1 | −0.9 | 0.1 | −1.1 |
| 1025 | 0.4 | −1.1 | −1.7 | −2.3 | −1.2 | −0.4 | −1.2 | −0.9 | 0.1 | −1.1 |
| 1030 | 0.4 | −1.5 | −1.8 | −2.6 | −1.2 | −0.5 | −1.4 | −0.8 | 0.1 | −1.0 |
| 1035 | 0.7 | −2.0 | −2.1 | −3.1 | −1.4 | −0.6 | −1.7 | −0.8 | 0.2 | −0.9 |
| 1040 | 0.9 | −2.2 | −2.6 | −3.1 | −1.8 | −0.8 | −1.7 | −0.6 | 0.4 | −0.7 |
| 1045 | 0.8 | −1.6 | −2.7 | −2.6 | −1.8 | −0.8 | −1.5 | 0.0 | 1.0 | −0.2 |

As measured by high temperature gel permeation chromatography using polyethylene standards for calibration, the peak average molecular weight ($M_p$), number average molecular weight ($M_n$), weight average molecular weight ($M_w$), and polydispersity (MWD) as measured by high temperature gel permeation chromatography for these waxes were as follows:

|  | $M_p$ | $M_n$ | $M_w$ | MWD |
|---|---|---|---|---|
| PE 500 | 572 | 516 | 570 | 1.10 |
| PE 655 | 795 | 729 | 785 | 1.08 |
| PE-A | 582 | 574 | 613 | 1.07 |
| PE-B | 611 | 613 | 646 | 1.05 |
| PE-C | 582 | 562 | 579 | 1.03 |
| FT-A | 516 | 520 | 528 | 1.02 |
| FT-B | 558 | 565 | 588 | 1.04 |
| FT-C | 620 | 619 | 635 | 1.03 |
| FT-D | 631 | 627 | 643 | 1.03 |
| FT-E | 637 | 630 | 646 | 1.03 |

Peak melting point (° C., as measured by differential scanning calorimetry using a DUPONT 2100 calorimeter according to ASTM D 3418-03), onset melting point (° C., as measured by differential scanning calorimetry), viscosity at 110° C. (centipoise, measured using a Rheometric Scientific DSR-2000 cone-plate rheometer), and freezing point (° C., as measured by differential scanning calorimetry) of the high temperature gel permeation chromatography data of these waxes were as follows:

|  | peak MP | onset MP | melting range | viscosity | FP |
|---|---|---|---|---|---|
| PE 500 | 81.2 | 52.5 | 42.2 | 5.44 | 70.3 |
| PE 655 | 94.6 | 72.3 | 29.6~33.0 | 9.80 | 85.5 |
| PE-A | 82.8 | 57.4 | 36.9 | 6.03 | 70.7 |
| PE-B | 86.0 | 66.3 | 30.0 | 6.65 | 77.6 |
| PE-C | 83.8 | 65.5 | 24.1 | 5.18 | 67.4 |
| FT-A | 78.2 | 68.7 | — | 4.49 | 66.3 |
| FT-B | 82.1 | 69.5 | 22.1 | 5.53 | 70.1 |
| FT-C | 85.1 | 73.3 | 17.1 | 6.09 | 76.6 |
| FT-D | 86.1 | 74.5 | 16.2 | 6.26 | 78.2 |
| FT-E | 86.7 | 74.6 | 17.7 | 6.33 | 77.6 |

— = not measured or determined

In some specific embodiments, the Fischer-Tropsch wax in the inks disclosed herein have had some of the lowest molecular weight fraction removed therefrom, in one embodiment at least about the lowest 5 percent molecular weight fraction removed therefrom, in another embodiment at least about the lowest 7.5 percent molecular weight fraction removed therefrom, in yet another embodiment at least about the lowest 10 percent molecular weight fraction removed therefrom, in still another embodiment, at least about the lowest 12.5 percent molecular weight fraction removed therefrom, in another embodiment at least about the lowest 15 percent molecular weight fraction removed therefrom, in yet another embodiment at least about the lowest 20 percent molecular weight fraction removed therefrom, in still another embodiment at least about the lowest 25 percent molecular weight fraction removed therefrom, in another embodiment at least about the lowest 30 percent molecular weight fraction removed therefrom, and in yet another embodiment at least about the lowest 35 percent molecular weight fraction removed therefrom, although the amount removed therefrom can be outside of these ranges.

The lowest molecular weight fraction and the highest molecular weight fraction can be removed from the Fischer-Tropsch wax by any desired or effective method, including (but not limited to) the distillation methods described in U.S. Patent Publication 2005/0130054, the disclosure of which is totally incorporated herein by reference, the purification methods set forth in Copending application Ser. No. 11/126,745 (U.S. Patent Publication 20060257495), the disclosure of which is totally incorporated herein by reference, or the like.

As stated hereinabove, the Fischer-Tropsch process used to generate the Fischer-Tropsch waxes differs from the polymerization of ethylene process used to generate polyethylene waxes in that the Fischer-Tropsch process tends to generate more branching in the resulting materials. $^{13}$C and $^1$H NMR spectra were used to measure the branching extent and number of pendant —OH groups in some of the Fischer-Tropsch and polyethylene waxes. Samples were dissolved in deuterated benzene and $^{13}$C NMR spectra were obtained on a Bruker Avance 400 NMR spectrometer at 78° C. In addition, DEPT (distortionless enhancement by polarization transfer) experiments were carried out to distinguish CH, $CH_2$, and $CH_3$ carbons as an aid to spectral assignment. $^1$H NMR measurements were made on the same samples on a Bruker Avance 500 NMR spectrometer at 78° C. The results were as follows:

| Wax | # isolated long branches per 100 chains | # methyl branches per 100 chains | # pendant —OH groups per 100 chains |
|---|---|---|---|
| PE 500 | trace | 0 | trace |
| PE-C | 0 | 1 | 1.2 |
| FT-B | 1.2 | 6.4 | 0 |

The Fischer-Tropsch wax is present in the ink in any desired or effective amount, in one embodiment at least about 1 percent by weight of the phase change ink carrier, in another embodiment at least about 3 percent by weight of carrier, and in yet another embodiment at least about 5 percent by weight of the carrier, and in one embodiment no more than about 99 percent by weight of the carrier, in another embodiment no more than about 97 percent by weight of the carrier, and in yet another embodiment no more than about 95 percent by weight of the carrier, although the amount can be outside of these ranges.

The ink carrier further comprises an amide. Examples of suitable ink carrier materials include fatty amides, such as monoamides, triamides, tetra-amides, mixtures thereof, and the like. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

In one specific embodiment, the amide is a branched triamide. Branched triamides are disclosed in, for example, U.S. Pat. No. 6,860,930, the disclosure of which is totally incorporated herein by reference. By "branched triamide" is meant that the structure of the triamide can be drawn so that each amide group is bonded to an atom or group of atoms contained in a branch other than that of the others, and that each amide group is in a different branch. By "each amide group is in a different branch" is meant that the triamide is not linear; by "linear" is meant a molecule wherein all three amide groups can be drawn as being in the same molecular chain or branch, such as linear triamides of the formulae $$R-\overset{O}{\underset{\|}{C}}-\overset{H}{\underset{|}{N}}-R-\overset{O}{\underset{\|}{C}}-\overset{H}{\underset{|}{N}}-R-\overset{O}{\underset{\|}{C}}-\overset{H}{\underset{|}{N}}-R,$$

-continued

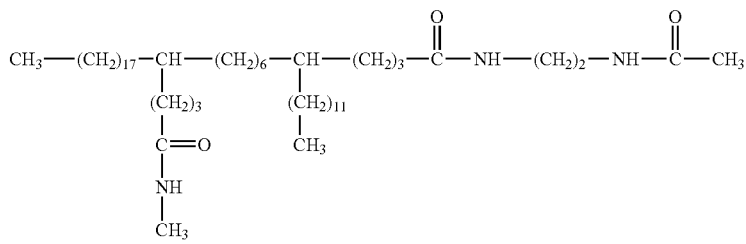

or the like. For purposes of the present invention, linear triamides include those wherein a line can be drawn through the three amide groups, even if one would ordinarily draw a different line. For example, a compound of the formula

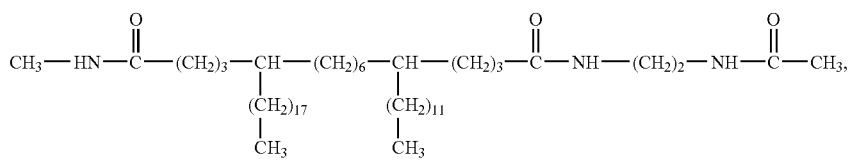

is considered a linear compound for purposes of the present invention, because it can also be drawn as follows:

and accordingly would not be considered to be a branched triamide for the purposes of the inks discloses herein. For purposes of the inks disclosed herein, "branched triamides", "branched triacids", "branched monoamino diacids", and "branched diamino monoacids" have similar definitions in that each of the three functional groups named can be drawn as being in a different branch from the other two.

Examples of suitable branched triamides include (but are not limited to) those generated from branched triamines, said branched triamines being of the formula

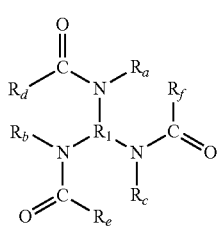

wherein $R_1$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_a$, $R_b$, and $R_c$, each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 7 carbon atoms, and in yet another embodiment with at least about 10 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_d$, $R_e$, and $R_f$ each, independently of the others, is (i) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 17 carbon atoms, and in yet another embodiment with at least about 36 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched triacids, said branched triamides being of the formula

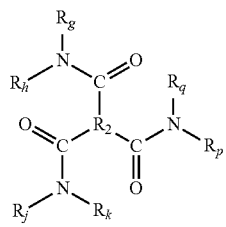

wherein $R_2$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_g$, $R_j$, and $R_p$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 6 carbon atoms, and in yet another embodiment with at least about 18 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_h$, $R_k$, and $R_q$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 4 carbon atoms, and in yet another embodiment with at least about 5 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched diamino monoacid compounds, said branched triamides being of the formula

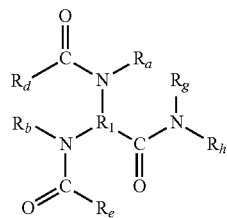

wherein $R_1$, $R_a$, $R_b$, $R_d$, $R_e$, $R_g$, and $R_h$ are as defined hereinabove, those generated from branched monoamino diacid compounds, said branched triamides being of the formula

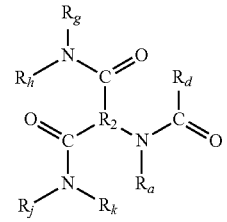

wherein $R_2$, $R_a$, $R_d$, $R_g$, $R_h$, $R_j$, and $R_k$ are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula

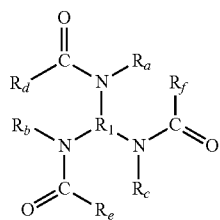

the total number of carbon atoms in $R_1+R_a+R_b+R_c+R_d+R_e+R_f$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_b$, $R_e$, $R_c$, and $R_f$, independently of the others, has no more than about 50 carbon atoms, and in yet another specific embodiment no more than about 48 carbon atoms, although the number of carbon atoms can be outside of these ranges.

In one specific embodiment, when the triamide is of the formula

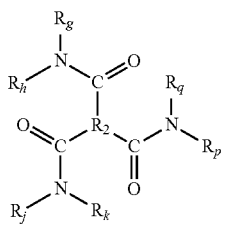

the total number of carbon atoms in $R_2+R_g+R_h+R_j+R_k+R_p+R_q$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_g$, $R_h$, $R_j$, $R_k$, $R_p$, and $R_q$, independently of the others, has no more than about 50 carbon atoms, and in yet another specific embodiment no more than about 48 carbon atoms, although the number of carbon atoms can be outside of these ranges.

In one specific embodiment, when the triamide is of the formula

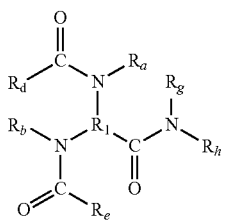

the total number of carbon atoms in $R_1+R_a+R_b+R_d+R_e+R_g+R_h$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_b$, $R_e$, $R_g$, and $R_h$, independently of the others, has no more than about 50 carbon atoms, and in yet another specific embodiment no more than about 48 carbon atoms, although the number of carbon atoms can be outside of these ranges.

In one specific embodiment, when the triamide is of the formula

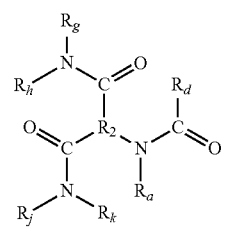

the total number of carbon atoms in $R_2+R_a+R_d+R_g+R_h+R_j+R_k$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_g$, $R_h$, $R_j$, and $R_k$, independently of the others, has no more than about 50 carbon atoms, and in yet another specific embodiment no more than about 48 carbon atoms, although the number of carbon atoms can be outside of these ranges.

It must be emphasized that not all of the amide groups in the first formula need to be directly bonded to the same atom in the $R_1$ or $R_2$ group, and in one specific embodiment of the present invention, each amide group is bonded to a different atom in the $R_1$ or $R_2$ group.

In one specific embodiment, the branched triamide is of the formula

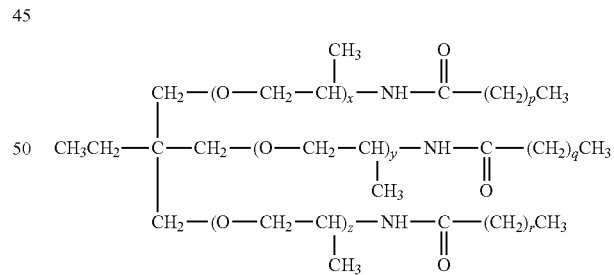

wherein x, y, and z each, independently represent the number of propyleneoxy repeat units and x+y+z is from about 5 to about 6, and wherein p, q, and r each, independently of the others, are integers representing the number of repeat —($CH_2$)— units and are in one embodiment at least about 15, in another embodiment is at least about 20, and in another embodiment is at least about 26, and are one embodiment no more than about 60, in another embodiment are no more than about 55, and are in yet another embodiment no more than about 45, although the value of p, q, and r can be outside of these ranges. The triamide composition is frequently obtained as a mixture of materials, wherein p, q, and r are each peak average chain length numbers within the composition, rather than uniform compositions wherein each molecule has the same value for p, q, and r, and it must be understood that within the mixture, some individual chains may be longer or shorter than the given numbers.

In this specific embodiment, the triamide is present in the ink in any desired or effective amount, in one embodiment at least about 2 percent by weight of the phase change ink carrier, in another embodiment at least about 5 percent by weight of carrier, and in yet another embodiment at least about 10 percent by weight of the carrier, and in one embodiment no more than about 50 percent by weight of the carrier, in another embodiment no more than about 40 percent by weight of the carrier, and in yet another embodiment no more than about 35 percent by weight of the carrier, although the amount can be outside of these ranges.

Additional examples of suitable phase change ink carrier materials are monoamides. Specific examples of suitable fatty amide ink carrier materials include stearyl stearamide, such as KEMAMIDE S-180, available from Crompton Corporation, Greenwich, Conn., and the like. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. In one specific embodiment, a monoamide is present in the ink carrier in an amount in one embodiment of at least about 0.01 percent by weight of the carrier, in another embodiment of at least 2 percent by weight of the carrier, and in yet another embodiment of at least 5 percent by weight of the carrier, and in one embodiment of no more than about 90 percent by weight of the carrier, in another embodiment of no more than about 80 percent by weight of the carrier, and in yet another embodiment of no more than about 70 percent by weight of the carrier, although the amount can be outside of these ranges.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

In one specific embodiment, the ink can contain a urethane resin obtained from the reaction of two equivalents of ABITOL® E hydroabietyl alcohol (available from Hercules Inc., Wilmington, Del.) and one equivalent of isophorone diisocyanate, prepared as described in Example 1 of U.S. Pat. No. 5,782,966, the disclosure of which is totally incorporated herein by reference. When present, this resin is present in the ink in one embodiment in an amount of at least about 1 percent by weight of the ink carrier, in another embodiment at least about 2 percent by weight of the ink carrier, in yet another embodiment at least about 3 percent by weight of the ink carrier, in still another embodiment at least about 4 percent by weight of the ink carrier, and in yet still another embodiment at least about 5 percent by weight of the ink carrier, and in one embodiment no more than about 80 percent by weight of the ink carrier, in another embodiment no more than about 70 percent by weight of the ink carrier, and in yet another embodiment no more than about 60 percent by weight of the ink carrier, although the amount can be outside of these ranges.

In another specific embodiment, the ink can contain a urethane resin that is the adduct of three equivalents of stearyl isocyanate and a glycerol-based alcohol prepared as described in Example 4 of U.S. Pat. No. 6,309,453, the disclosure of which is totally incorporated herein by reference. When present, this resin is present in the ink in one embodiment in an amount of at least about 0.5 percent by weight of the ink carrier, in another embodiment at least about 1 percent by weight of the ink carrier, and in yet another embodiment at least about 2 percent by weight of the ink carrier, and in one embodiment no more than about 40 percent by weight of the ink carrier, in another embodiment no more than about 35 percent by weight of the ink carrier, and in yet another embodiment no more than about 30 percent by weight of the ink carrier, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions also contain a bis-urethane. Examples of suitable bis-urethanes include those of the formula

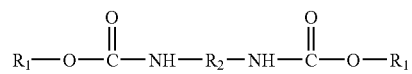

wherein each $R_1$, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 6 carbon atoms, and in yet another embodiment with at least about 10 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, and $R_2$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, and wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In specific embodiments, $R_1$ is derived from an oxidized petroleum or synthetic wax and $R_2$ is of the formula

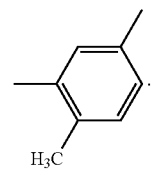

Examples of commercial bis-urethanes suitable for use herein include PETROLITE CA-11® ($M_n$=790, $M_w/M_n$=2.2), PETROLITE WB-5® ($M_n$=650, $M_w/M_n$=1.7), and PETROLITE WB-17® ($M_n$=730, $M_w/M_n$=1.8), all available from Baker Petrolite.

The bis-urethane is present in the phase change ink in any desired or effective amount, in one embodiment at least about 0.5 percent by weight of the ink, in another embodiment at least about 1 percent by weight of the ink, and in yet another embodiment at least about 1.5 percent by weight of the ink, and in one embodiment no more than about 80 percent by weight of the ink, in another embodiment no more than about 8 percent by weight of the ink, and in yet another embodiment no more than about 5 percent by weight of the ink, although the amount can be outside of these ranges.

The phase change ink compositions also contain a carbon black pigment colorant. Examples of suitable carbon black pigments include SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Degussa, MOGUL L, REGAL 400R, REGAL 330, and MONARCH 900, available from Cabot Chemical Co., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, RAVEN 2500 ULTRA, Carbon Black 5250, and Carbon Black 5750 available from Columbia Chemical Co., and the like.

The carbon black pigment is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

If desired, the ink can also contain a dye in addition to the pigment colorant.

To enable dispersion of the pigment colorants in the liquid phase change ink vehicle, a dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like. Thus, examples of suitable first functional groups that anchor the dispersant to the pigment particles include such functional groups as esters, amides, carboxylic acids, hydroxyl groups, anhydrides, urethanes, ureas, amines, amides and salt groups such as quaternary ammonium salts, and the like. The first functional groups anchor the dispersant to the colorant particles such that the dispersant is, for example, adsorbed, attached to, or grafted to the pigment particle. Likewise, examples of the second functional groups that are compatible with the ink vehicle include groups such as alkyl groups, which can be straight or branched, saturated or unsaturated, and the like. These second functional groups are compatible with, in particular, low polarity ink vehicle components.

Dispersants suitable for use herein that reduce weeping in the ink include a combination of at least one triamide and at least one bis-urethane. By "reducing weeping," it is meant that the ink including the dispersants disclosed herein demonstrates substantially no weeping. The dispersant or mixture of dispersants is present in any desired or effective amount, in one embodiment at least about 0.5 parts by weight dispersant per one part by weight pigment, and in another embodiment at least about 1 part by weight dispersant per one part by weight pigment, and in one embodiment no more than about 40 parts by weight dispersant per one part by weight pigment, in another embodiment no more than about 20 parts by weight dispersant per one part by weight pigment, and in yet another embodiment no more than about 10 parts by weight dispersant per one part by weight pigment, although the amount can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 445, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.05 percent by weight of the ink, in yet another embodiment of at least about 0.1 percent by weight of the ink, and in yet still another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 0.5 percent by weight of the ink, and in yet another embodiment of at least about 1 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have peak melting points of no lower than about 50° C., in another embodiment of no lower than about 55° C., and in yet another embodiment of no lower than about 60° C., and have melting points in one embodiment of no higher than about 105° C., in another embodiment of no higher than about 100° C., and in yet another embodiment of no higher than about 95° C., although the peak melting point can be outside of these ranges.

The ink compositions generally have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 120° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the inks can be prepared by first preparing the ink vehicle in a first container by mixing the components of the ink vehicle at temperatures of in one embodiment at least about 90° C., in another embodiment at least about 100° C., and in yet another embodiment at least about 110° C., and in one embodiment no more than about 150° C., in another embodiment no more than about 145° C., and in yet another embodiment no more than about 140° C., although the temperatures can be outside of these ranges. In a separate container, the triamide in powder form, the bis-urethane in powder form, and the pigment in powder form are all mixed together. The powder mixture can then be introduced into an extruder or the like, for example a twin screw extruder. The contents in the extruder can then be mixed at temperatures of in one embodiment at least about 45° C., in another embodiment at least about 50° C., and in yet another embodiment at least about 60° C., and in one embodiment no more than about 90° C., in another embodiment no more than about 85° C., and in yet another embodiment no more than about 80° C., although the temperature can be outside of these ranges, in one embodiment at least about 10 RPM, in another embodiment at least about 25 RPM, and in yet another embodiment at least about 40 RPM, and in one embodiment at no more than about 200 RPM, in another embodiment at no more than about 100 RPM, and in yet another embodiment at no more than about 65 RPM, although the rate can be outside of these ranges. The contents can then be extruded and melt-mixed with the ink vehicle in the first container to form an ink. When the contents are melt-mixed, they can also be high shear mixed.

In further embodiments, the ink can be prepared by first preparing the ink vehicle in a first container by mixing the components of the ink vehicle and the bis-urethane at temperatures of in one embodiment at least about 90° C., in another embodiment at least about 100° C., and in yet another embodiment at least about 110° C., and in one embodiment no more than about 150° C., in another embodiment no more than about 145° C., and in yet another embodiment no more than about 140° C., although the temperatures can be outside of these ranges. In a separate container, the triamide in powder form and the pigment in powder form are all mixed together. The powder mixture can then be introduced into an extruder and the like, for example a twin screw extruder. The contents in the extruder can then be mixed at temperatures of in one embodiment at least about 45° C., in another embodiment at least about 50° C., and in yet another embodiment at least about 60° C., and in one embodiment no more than about 110° C., in another embodiment no more than about 85° C., and in yet another embodiment no more than 80° C., although the temperature can be outside of these ranges, in one embodiment at least about 10 RPM, in another embodiment at least about 25 RPM, and in yet another embodiment at least about 40 RPM, and in one embodiment at no more than about 200 RPM, in another embodiment at no more than about 100 RPM, and in yet another embodiment at no more than about 65 RPM, although the rate can be outside of these ranges. The contents can then be extruded and melt-mixed with the ink vehicle in the first container to form an ink. When the contents are melt-mixed, they can also be high shear mixed.

In yet further embodiments, the ink can be prepared as described above, except that the powder mixture is not introduced into an extruder. In other words, the powder mixture is not extruded prior to melt-mixing with the ink vehicle. As in other embodiments, when the ink contents are melt-mixed, they can also be high shear mixed.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

Example I

An ink composition was prepared by the following process. A branched triamide of the formula

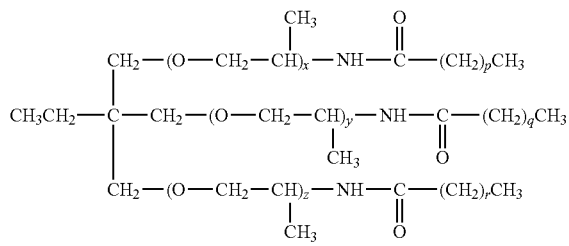

wherein p, q, and r each have an average value of about 35, 9.72 weight percent, prepared as described in Example II of U.S. Pat. No. 6,860,930, the disclosure of which is totally incorporated herein by reference, was processed through a blender to form a powder. A bis-urethane, PETROLITE® WB-17, obtained from Baker Petrolite, was also processed through a blender to form a powder. Thereafter, 617.98 grams of the powderized triamide resin, 224.72 grams of the powdered bis-urethane, and 157.30 grams of NIPEX® 150 carbon black (obtained from Degussa Canada, Burlington, Ontario) were admixed in a LITTLEFORD M5 blender for 30 minutes. Subsequently, the powder mixture was added at a rate of 0.8 pounds per hour to a DAVO counter-rotating twin screw extruder (Model VS 104, obtained from Deutsche Apparate-Vertrieborganisation GmbH & Co, Troisdorf, Germany). The contents in the extruder were then mixed at 70° C. at 50 RPM. The outlet temperature was set at 75° C. The pigment extrudate thus formed is hereinafter referred to as Extrudate A.

The following components were then melted and stir-mixed in a 4 liter beaker (beaker A) at 125° C.: Extrudate A (393.05 grams); stearyl stearamide wax (KEMAMIDE® S-180, obtained from Crompton Corp., Greenwich, Conn., 350.99 g); KE-100 resin (triglycerides of hydrogenated abietic (rosin) acid, obtained from Arakawa Chemical Industries Ltd., 242.90 grams); and NAUGARD® N445 antioxidant (obtained from Crompton Corp., Greenwich, Conn., 3.31 grams). Beaker A was equipped with a heating mantle and a mechanical stirrer. This carbon black dispersion was heated and stirred for one hour at 125° C. While the pigment dispersion was prepared in beaker A, another mixture was prepared in a separate beaker. In a 4 liter beaker (beaker B) at 125° C. two ingredients were melt-mixed: a Fischer-Tropsch wax (SASOLWAX® C80, obtained from Sasol Wax Americas, Inc., $M_p$=558, $M_n$=565, $M_w$=588, MWD=1.04 as measured by HT-GPC, 1,454.55 grams), and a urethane resin prepared as described in Example 4 of U.S. Pat. No. 6,309,453, the disclosure of which is totally incorporated herein by reference (55.20 grams). Beaker B was also equipped with a heating mantle and a mechanical stirrer. The resin dispersion in beaker B was heated and stirred for an hour to ensure that all resins were fully melt-mixed.

An IKA Ultra Turrax T50 homogenizer was then used to homogenize the ingredients in beaker A for 30 minutes with the temperature maintained at 125° C. during homogenization. The molten resin mixture in beaker B, which was kept at 125° C. was thereafter added into the homogenized pigment dispersion in beaker A. The carbon black ink in beaker A was further homogenized for an additional 30 minutes and thereafter its rheology was measured using an AR2000 rheometer. After filtering the resulting carbon black ink subsequently through a 1 µm and then a 0.45 µm glass fiber cartridge-filter at 115° C., the ink was cooled to room temperature. The final ink was then incorporated into a XEROX® PHASER® 8400 printer and tested for weeping.

The ink thus prepared exhibited a viscosity of 10.60 centipoise as measured by a Rheometrics DSR-2000 cone-plate rheometer at 110° C. The ink was incorporated into a XEROX® PHASER® 8400 printer modified to print at a temperature of 109° C. and used to generate prints on 24# Hammermill Laser print paper. The ink performed well with no jetting issues. As the term implies, fold durability relates to the ability of the ink (on the recording sheet) to be folded without cracking, breaking, and/or falling off the page leaving a line of missing ink. Fold is quantified by measuring the average width of the white area left after a fold. A solid fill is used since it is a stress case. The prints exhibited excellent fold of 0.44. Dropout refers to the efficiency of ink transfer from the print engine to the final recording sheet. When dropout is very bad, part of the image is missing from the print (i.e., the pixels are not transferred from the intermediate transfer member to the final recording sheet). Dither dropout refers to a transfer failure when printing dithered images (for example, 30 percent to 70 percent coverage) and on rough recording sheets. Dither dropout was slightly higher at 7,000 than that of the ink of Example 3 in U.S. application Ser. No. 11/553,260, which had a dither dropout of 5,500. Since dither dropout depends on the printer set-up, the hardware setting, the viscosity of the ink, and the paper used, it is believed that with optimization of the ink formulation of the ink disclosed herein and with optimization of the printer parameters, the dither dropout of the ink disclosed herein can match that of the ink disclosed in the copending application.

Example II

The process of Example I is repeated except that the amounts of the ingredients are varied as follows:

| ingredient | IIA | IIB | IIC | IID | IIE |
|---|---|---|---|---|---|
| Fischer-Tropsch wax | 55.79 | 58.56 | 65.23 | 56.49 | 49.44 |
| tri-amide | 7.60 | 10.00 | 11.40 | 18.00 | 5.00 |

-continued

| ingredient | IIA | IIB | IIC | IID | IIE |
|---|---|---|---|---|---|
| stearyl stearamide | 12.56 | 11.00 | 9.89 | 12.00 | 20.35 |
| KE-100 Resin | 11.30 | 7.34 | 8.23 | 6.00 | 15.00 |
| urethane resin | 5.30 | 5.50 | 0.50 | 2.36 | 3.44 |
| bis-urethane | 4.25 | 5.00 | 2.00 | 3.00 | 4.82 |
| carbon black | 3.00 | 2.47 | 2.60 | 1.75 | 1.85 |
| antioxidant | 0.20 | 0.13 | 0.15 | 0.40 | 0.10 |

Example III

The process of Example I is repeated except that Fischer-Tropsch wax obtained from Sasol Wax Americas, Inc., Shelton, Conn. as SASOLWAX® C77, $M_p$=516, $M_n$=520, $M_w$=528, MWD=1.02 as measured by HT-GPC is substituted for the C80 wax.

Example IV

The process of Example I is repeated except that Fischer-Tropsch wax obtained from Sasol Wax Americas, Inc., said wax being similar to SASOLWAX® C80 but having had removed by distillation the lowest 5 percent molecular weight fraction, $M_p$=612, $M_n$=605, $M_w$=626, MWD=1.03 as measured by HT-GPC is substituted for the C80 wax.

Example V

The process of Example I is repeated except that Fischer-Tropsch wax obtained from Sasol Wax Americas, Inc., said wax being similar to SASOLWAX® C80 but having had removed by distillation the lowest 9 percent molecular weight fraction, $M_p$=620, $M_n$=619, $M_w$=635, MWD=1.03 as measured by HT-GPC is substituted for the C80 wax.

Example VI

The process of Example I is repeated except that Fischer-Tropsch wax obtained from Sasol Wax Americas, Inc., said wax being similar to SASOLWAX® C80 but having had removed by distillation the lowest 20 percent molecular weight fraction, $M_p$=631, $M_n$=627, $M_w$=643, MWD=1.03 as measured by HT-GPC is substituted for the C80 wax.

Example VII

The process of Example I is repeated except that Fischer-Tropsch wax obtained from Sasol Wax Americas, Inc., said wax being similar to SASOLWAX® C80 but having had removed by distillation the lowest 30 percent molecular weight fraction, $M_p$=637, $M_n$=630, $M_w$=646, MWD=1.03 as measured by HT-GPC is substituted for the C80 wax.

Example VIII

The processes of Examples I through VII are repeated except that a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, is substituted for the KE-100 resin.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising (a) a carbon black pigment, (b) a bis-urethane present in the ink in an amount of no more than about 8 percent by weight of the ink, and (c) a phase change ink carrier, said carrier comprising (i) a branched triamide and (ii) a Fischer-Tropsch wax having an average peak molecular weight of from about 300 to about 800 and a polydispersity of from about 1.001 to about 3, wherein the bis-urethane is of the formula:

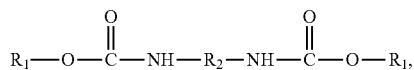

$R_1$ is an oxidized petroleum wax or an oxidized synthetic wax and $R_2$ is of the formula

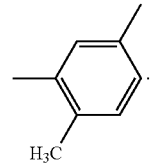

2. The phase change ink according to claim 1 wherein the Fischer-Tropsch wax is present in the ink in an amount of at least about 3 percent by weight of the carrier.

3. The phase change ink according to claim 1 wherein the Fischer-Tropsch wax is present in the ink in an amount of no more than about 97 percent by weight of the carrier.

4. The phase change ink according to claim 1 wherein the branched triamide is of the formula

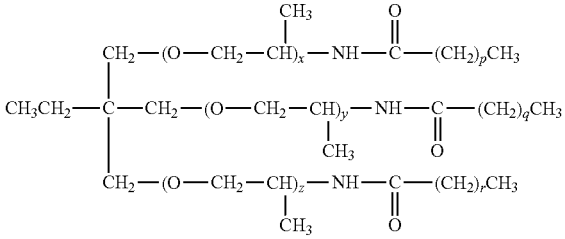

wherein x, y, and z each independently represent the number of propyleneoxy repeat units and x+y+z is from about 5 to about 6, and wherein p, q, and r each, independently of the others, are integers representing the number of repeat —(CH$_2$)— units.

5. The phase change ink according to claim 4 wherein p, q, and r have an average peak value of from about 15 to about 60.

6. The phase change ink according to claim 4 wherein p, q, and r have an average peak value of from about 26 to about 45.

7. The phase change ink according to claim 1 wherein the branched triamide is present in the ink in an amount of at least about 5 percent by weight of the carrier.

8. The phase change ink according to claim 1 wherein the branched triamide is present in the ink in an amount of no more than about 40 percent by weight of the carrier.

9. The phase change ink according to claim 1 wherein the carrier further comprises a monoamide.

10. The phase change ink according to claim 9 wherein the monoamide is stearyl stearamide.

11. The phase change ink according to claim 9 wherein the monoamide is present in the ink in an amount of at least about 2 percent by weight of the carrier.

12. The phase change ink according to claim 9 wherein the monoamide is present in the ink in an amount of no more than about 80 percent by weight of the carrier.

13. The phase change ink according to claim 1 wherein the carrier further comprises a urethane resin.

14. The phase change ink according to claim 13 wherein the urethane resin is obtained from the reaction of two equivalents of hydroabietyl alcohol and one equivalent of isophorone diisocyanate.

15. The phase change ink according to claim 13 wherein the urethane resin is the adduct of three equivalents of stearyl isocyanate and a glycerol-based alcohol.

16. The phase change ink according to claim 1 wherein the carbon black pigment is present in the ink in an amount of at least about 0.2 percent by weight of the ink.

17. The phase change ink according to claim 1 wherein the carbon black pigment is present in the ink in an amount of no more than about 20 percent by weight of the ink.

18. The phase change ink according to claim 1, further comprising a dispersant.

19. The phase change ink according to claim 18, wherein the dispersant comprises a first functional group and a second functional group.

20. The phase change ink according to claim 19, wherein the first functional group is selected from the group consisting of esters, amides, carboxylic acids, hydroxyl groups, anhydrides, urethanes, ureas, amines, amides, and quaternary ammonium salts.

* * * * *